(12) United States Patent
Sheiner

(10) Patent No.: US 12,425,064 B2
(45) Date of Patent: Sep. 23, 2025

(54) PORTABLE ELECTRONIC DEVICE COVER TO PREVENT OVERHEATING AND SCREEN GLARE

(71) Applicant: SHEINER ENGINEERING & DESIGN, LLC, Whitestone, NY (US)

(72) Inventor: Brandon Michael Sheiner, Whitestone, NY (US)

(73) Assignee: SHEINER ENGINEERING & DESIGN, LLC, Whitestone, NY (US)

( * ) Notice: Subject to any disclaimer, the term of this patent is extended or adjusted under 35 U.S.C. 154(b) by 563 days.

(21) Appl. No.: 17/817,628

(22) Filed: Aug. 4, 2022

(65) Prior Publication Data

US 2023/0042062 A1    Feb. 9, 2023

Related U.S. Application Data

(60) Provisional application No. 63/229,958, filed on Aug. 5, 2021.

(51) Int. Cl.
*H04B 1/3888*    (2015.01)

(52) U.S. Cl.
CPC .................................. *H04B 1/3888* (2013.01)

(58) Field of Classification Search
CPC ............ H04B 1/02–036; H04B 1/3888; H04B 2001/3894; H05K 5/0018; H05K 5/02–30; H05K 7/12–14; H04M 1/0203; H04M 1/04–185

See application file for complete search history.

(56) References Cited

U.S. PATENT DOCUMENTS

| | | |
|---|---|---|
| 7,398,612 B2 | 7/2008 | Zheng |
| 9,596,332 B2 | 3/2017 | Gander et al. |
| 10,021,227 B2 | 7/2018 | Gander et al. |
| 10,310,559 B2 | 6/2019 | Holmes |
| 10,355,736 B2 | 7/2019 | Zaccaria |
| 10,368,622 B1 * | 8/2019 | Eckert ................. A45C 13/001 |
| 10,379,572 B2 | 8/2019 | Jacobs |
| 10,382,603 B1 | 8/2019 | Doria |
| 2014/0150837 A1 | 6/2014 | Shadyfacecom |
| 2014/0375901 A1 | 12/2014 | Stockett |
| 2016/0269068 A1 | 9/2016 | Tymus |

FOREIGN PATENT DOCUMENTS

| | | |
|---|---|---|
| CN | 202488530 U | 10/2012 |
| CN | 203106077 U | 8/2013 |
| CN | 103565066 A | 2/2014 |
| EP | 3407158 A1 | 11/2018 |
| KR | 20180005388 A | 1/2018 |
| KR | 101929518 B1 | 12/2018 |

* cited by examiner

*Primary Examiner* — Ronald Eisner

(57) ABSTRACT

Provided are covers for portable electronic devices comprising a series of interconnected panels which define an interior volume, a resilient support member received within a retaining sleeve, and a brace. Related methods of and use are further provided.

19 Claims, 7 Drawing Sheets

PORTABLE ELECTRONIC DEVICE COVER TO PREVENT OVERHEATING AND SCREEN GLARE

CROSS-REFERENCE TO RELATED APPLICATIONS

This application claims priority to and the benefit of U.S. Provisional Application Ser. No. 63/229,958, which was filed on Aug. 5, 2021, the contents of which is hereby incorporated by reference in its entirety.

BACKGROUND

Portable electronic devices such as tablets and mobile phones have become essential tools for everyday life. Many people use their phone as not only their primary means of communication with others, but also as a source of entertainment and information. Since their inception, mobile phones have evolved and improved to have increased computing power, longer battery life, and a variety of increasingly capable wireless technology options for sending and receiving data. As a result, the full spectrum of a mobile phone's applications may be used anywhere that it can be carried.

A basic limitation of mobile phones is that the temperature of the equipment must be kept within an acceptable range. If the equipment is not kept below the acceptable maximum temperature limit, the equipment can overheat and result in a variety of performance issues. For example, if left unchecked overheating may cause permanent irreparable damage to the equipment's hardware. The risk of overheating is amplified outdoors, especially when using a mobile phone for prolonged periods of time with exposure to the sun. Extended use of mobile phones outdoors therefore must be limited to shaded areas, which may not be available, depending on location. This limitation creates a barrier to enjoying the outdoors and, in effect, limits the portability of mobile phones.

Additionally, when mobile phones are used outdoors, sunlight reflecting from the screen of the phone can produce a glare, prompting a user to increase brightness of the screen. This, however, exacerbates the potential of overheating, while also speeding the battery drain of the device. Without substantially altering the brightness of the screen, the contents of the screen become difficult to discern and may also lead to eye strain and fatigue.

While there are several screen protectors advertised to be "anti-glare," these anti-glare screen protectors do not protect the phone from the heat of direct sunlight and do not always work very well at preventing glare from most viewing angles. Many of the anti-glare and shade covers of the prior art are bulky and not easily removed from the phone. Some are intended to be permanently affixed, which makes holding and pocketing the phone more difficult.

There is thus a need in the art to more freely use a mobile phone outdoors without necessitating choice between being confined to a shaded area or the risk of overheating the device. There is further need for a product that allows a user to shield their phone from direct sunlight to prevent overheating and eliminate screen glare during use, while remaining lightweight, portable, quickly removeable and easily manufactured.

SUMMARY

Accordingly, provided herein are covers for portable electronic devices, e.g., mobile phones, smartphones or tablets, which allow users the ability of more freely using their electronics outdoors without needing to choose between shaded area or sacrificing battery life or risking overheating their device. Further provided herein are products capable of allowing a user to shield their phone from direct sunlight to prevent overheating and eliminate screen glare during use, while remaining lightweight, portable, quickly removeable and easily manufactured.

In a first aspect, the present disclosure is directed to a cover [Cover 1] for a portable electronic device comprising:
- a series of interconnected panels comprising:
  - two oppositely positioned side panels,
  - a top panel and oppositely positioned to a base panel connected to the side panels, and
  - a rear panel connected to each of the side panels, the top panel and the base panel;
- at least one resilient support member received within at least one retaining sleeve on one or more of the oppositely positioned side panels, top panel, base panel, or rear panel; and
- a brace for the portable electronic device having at least one strap comprising a first end disposed with one or more of the side panels, top panel, base panel or rear panel, and a second end disposed adjacent the portable electronic device.

In some embodiments, Cover 1 is further defined as follows.

1.1 Cover 1, wherein the brace comprises a dock for the portable electronic device.

1.2 Cover 1 or 1.1, wherein the dock comprises at least one groove to receive the at least one strap.

1.3 Any of the preceding Covers, comprising a plurality of straps (e.g., two, three or four straps), each strap comprising a first end disposed with one of the side panels, top panel, base panel or rear panel (e.g., a perimeter of the rear panel), and a second end received in a corresponding groove of the dock.

1.4 Any of the preceding Covers, comprising two straps, wherein both straps comprise a first end disposed with one of the side panels, top panel, base panel or rear panel (e.g., a perimeter of the rear panel), and a second end received in a corresponding groove of the dock.

1.5 Any of the preceding Covers, comprising three straps, each strap comprising a first end disposed with one of the side panels, top panel, base panel or rear panel (e.g., a perimeter of the rear panel), and a second end received in a corresponding groove of the dock.

1.6 Any of the preceding Covers, comprising four straps, each strap comprising a first end disposed with the perimeter of one or more of the side panels, top panel, base panel, rear panel, and optionally front panel, and a second end, and wherein the dock comprises four grooves (e.g., respectively positioned adjacent the corners of the dock), such that the second end of each strap is received in a corresponding groove of the dock.

1.7 Any of the preceding Covers, wherein the at least one strap is elastic.

1.8 Any of the preceding Covers, wherein the at least one strap is slidably engaged with one or more of the side panels, top panel, base panel or rear panel, such that the at least one strap is moveable along a direction defined by a slide track disposed on one or more of the side panels, top panel, base panel or rear panel.

1.9 Any of the preceding Covers, comprising two, three or four straps, each of which is slidably engaged with one or more of the side panels, top panel, base panel or rear panel, such that the at least one strap is moveable along a direction defined by a slide track disposed along a perimeter of the rear panel.

1.10 Any of the preceding Covers, comprising two, three or four straps, each of which is slidably engaged with one of the side panels, such that the at least one strap is moveable along a direction defined by a slide track disposed along a perimeter of one of the side panels.

1.11 Any of the preceding Covers, comprising two straps, wherein both straps comprise a first end disposed with the perimeter of one of the side panels (e.g., an edge of the side panel perimeter in contact with an edge of the perimeter of the top or base panel), and a second end received in a corresponding groove of the dock.

1.12 Any of the preceding Covers, comprising three straps, each strap comprising a first end disposed with one of the side panels (e.g., an edge of the side panel perimeter in contact with an edge of the perimeter of the top or base panel), and a second end received in a corresponding groove of the dock.

1.13 Any of the preceding Covers, comprising four straps, each strap comprising a first end disposed with the perimeter of one of the side panels (e.g., an edge of the side panel perimeter in contact with an edge of the perimeter of the top or base panel), and a second end, and wherein the dock comprises four grooves (e.g., respectively positioned adjacent the corners of the dock), such that the second end of each strap is received in a corresponding groove of the dock.

1.14 Any of the preceding Covers, comprising four straps, wherein the first and second straps are oppositely positioned and comprise a first end disposed with opposite edges of the side panels in contact with the correspondingly opposite edges of the top panel, and wherein the third and fourth straps are oppositely positioned and comprise a first end disposed with opposite edges of the side panels in contact with the correspondingly opposite edges of the base panel, wherein each of the four straps further comprises a second end, and wherein the dock comprises four grooves (e.g., respectively positioned adjacent the corners of the dock), such that the second end of each strap is received in a corresponding groove of the dock.

1.15 Any of the preceding Covers, wherein the dock comprises at least one tether (e.g., two, three or four tethers) extending from a front face of the dock to secure the portable electronic device to a front face of the dock.

1.16 The preceding Cover, wherein the tether is elastic.

1.17 Cover 1.10 or 1.11, wherein the at least one tether possesses sufficient elastic character to secure an electronic device to the front face of the dock, such that once engaged, the portable electronic device will be substantially immovable relative to the dock.

1.18 Any of Covers 1.10-1.12, wherein the dock comprises four tethers of sufficient elastic character to secure an electronic device to the front face of the dock, e.g., wherein the four tethers possess sufficient elastic character to slip around a respective corner of a portable electronic device to maintain consistent and secure contact between the device and the front face of the dock, such that once engaged, the portable electronic device will be substantially immovable relative to the dock.

1.19 Any of the preceding Covers, wherein the dock comprises a loop on a rear face of said dock.

1.20 The preceding Cover, wherein the loop is sized to receive one or more fingers or a hand.

1.21 Any of the preceding Covers, further comprising a front panel which is parallel with and positioned opposite the rear panel.

1.22 Any of the preceding Covers, wherein the retaining sleeve is disposed along perimeters of one or more of the side panels, top panel, base panel, rear panel and front panel.

1.23 Any of the preceding Covers, wherein the retaining sleeve is disposed along perimeters of each of the side panels, front panel and rear panel.

1.24 Any of the preceding Covers, wherein the retaining sleeve is disposed along perimeters of each of the top panel, base panel, rear panel and front panel.

1.25 Any of the preceding Covers, wherein the retaining sleeve defines a channel configured to receive the resilient support member.

1.26 Any of the preceding Covers, comprising a plurality of resilient support members configured to conform to perimeters of one or more of the side panels, top panel, base panel, rear panel, and front panel.

1.27 Any of the preceding Covers, wherein one or more of the side panels, top panel, base panel, rear panel and front panel individually comprise a retaining sleeve disposed along perimeters of the respective panels.

1.28 Any of the preceding Covers, wherein each of the side panels, rear panel and front panel individually comprise a resilient support member received within a respective individual retaining sleeve.

1.29 Any of the preceding Covers, wherein the retaining sleeve defines a channel that is continuous between the perimeters of adjacent panels, e.g., wherein the retaining sleeve conforms to the perimeters of the side panels, top panel, base panel and rear panel.

1.30 The preceding Cover, comprising a first resilient support member in a first portion of the retaining sleeve disposed along the perimeter of a first side panel, a second resilient support member in a second portion of the retaining sleeve disposed along the perimeter of a second side panel, a third resilient support member in a third portion of the retaining sleeve disposed along the perimeter of the rear panel, and a fourth resilient support member in a fourth portion of the retaining sleeve disposed along the perimeter of the front panel.

1.31 Any of the preceding Covers, wherein each of the side panels, the top panel, the base panel and the rear panel comprise a material (e.g., an elastomeric mesh material, a non-elastomeric mesh material, an elastomeric opaque material, or a non-elastomeric opaque material) extending along a surface defined by the respective perimeters of the panels.

1.32 Any of the preceding Covers, wherein the front panel does not comprise a material extending along a surface defined by its perimeter.

1.33 The preceding Cover, wherein the front panel comprises a retaining sleeve and a resilient support member contained within the retaining sleeve.

1.34 Any of the preceding Covers, wherein each of the side panels, the top panel, the base panel and the rear panel comprise a material (e.g., an elastomeric mesh material, a non-elastomeric mesh material, an elastomeric opaque material, or a non-elastomeric opaque material) extending along a surface defined by the respective perimeters of the panels; and wherein the front panel does not comprise a material extending along a surface defined by its perimeter.

1.35 Any of the preceding Covers, wherein at least one of the side panels, top panel, base panel and rear panel (e.g., both side panels) comprises an access opening.
1.36 The preceding Cover, wherein one or both of the side panels comprises an access opening.
1.37 Either of the two preceding Covers, wherein said side panels comprise a flap positioned adjacent an access opening, wherein the flap is connected to one of the side panels at a first end and attachable at a second end.
1.38 The preceding Cover, wherein said flap is moveable to allow passage through the access opening.
1.39 Any of the preceding Covers, wherein the resilient support member is formed of non-brittle metal, such as aluminum or steel (e.g., spring steel), a polymer, carbon (e.g., carbon fiber), or other resilient composite material.
1.40 Any of the preceding Covers, wherein the resilient support member is formed of steel (e.g., spring steel).
1.41 Any of the preceding Covers, wherein the resilient support member is formed of spring steel.
1.42 Any of the preceding Covers, wherein the cover is movable between an expanded configuration and a collapsed configuration.
1.43 Any of the preceding Covers, wherein the interior volume is sized to receive a portable electronic device containing a screen (e.g., a cellular phone or a tablet).
1.44 Any of the preceding Covers, wherein the portable electronic device is one or more of a mobile phone (i.e., a smartphone), a tablet, a portable gaming device, or a monitor.
1.45 Any of the preceding Covers, wherein the electronic device is a tablet.
1.46 Any of the preceding Covers, wherein the electronic device is a mobile phone (i.e., a smartphone).

In a second aspect, the present disclosure is directed to a cover [Cover 2] for a portable electronic device comprising:
an awning comprising:
two oppositely positioned side panels; a top panel oppositely positioned to a base panel connected to the side panels; and a front panel oppositely positioned to a rear panel; wherein each panel other than the front panel comprises a material (e.g., an elastomeric mesh material, a non-elastomeric mesh material, an elastomeric opaque material, or a non-elastomeric opaque material) extending along a surface defined by the respective perimeters of the panels; and
at least one resilient support member received within at least one retaining sleeve on one or more of the oppositely positioned side panels, top panel, base panel, front panel or rear panel; and
a brace comprising:
a dock comprising at least one tether extending from a front face of the dock to secure the portable electronic device, the dock further comprising at least one groove;
a plurality of straps, each comprising a first end disposed with one or more of the side panels, top panel, bottom panel or rear panel, and a second end disposed with a respectively corresponding groove.

In some embodiments, Cover 2 is further defined as follows.
2.1 Cover 2, wherein the at least one groove is configured to receive the at least one strap.
2.2 Cover 2 or 2.1, comprising two straps, wherein both straps comprise a first end disposed with one of the side panels, top panel, base panel or rear panel, and a second end received in a corresponding groove of the dock.
2.3 Any of the preceding Covers, comprising three straps, each strap comprising a first end disposed with one of the side panels, top panel, base panel or rear panel, and a second end received in a corresponding groove of the dock.
2.4 Any of the preceding Covers, comprising four straps, each strap comprising a first end disposed with the perimeter of one or more of the side panels, top panel, base panel, rear panel, and optionally front panel, and a second end, and wherein the dock comprises four grooves (e.g., respectively positioned adjacent the corners of the dock), such that the second end of each strap is received in a corresponding groove of the dock.
2.5 Any of the preceding Covers, wherein the at least one strap is elastic.
2.6 Any of the preceding Covers, wherein the at least one strap is slidably engaged with one or more of the side panels, top panel, base panel or rear panel, such that the at least one strap is moveable along a direction defined by a slide track disposed on one or more of the side panels, top panel, base panel or rear panel.
2.7 Any of the preceding Covers, comprising two, three or four straps, each of which is slidably engaged with one or more of the side panels, top panel, base panel or rear panel, such that the at least one strap is moveable along a direction defined by a slide track disposed along a perimeter of the rear panel.
2.8 Any of the preceding Covers, comprising two, three or four straps, each of which is slidably engaged with one of the side panels, such that the at least one strap is moveable along a direction defined by a slide track disposed along a perimeter of one of the side panels.
2.9 Any of the preceding Covers, comprising two straps, wherein both straps comprise a first end disposed with the perimeter of one of the side panels (e.g., an edge of the side panel perimeter in contact with an edge of the perimeter of the top or base panel), and a second end received in a corresponding groove of the dock.
2.10 Any of the preceding Covers, comprising three straps, each strap comprising a first end disposed with one of the side panels (e.g., an edge of the side panel perimeter in contact with an edge of the perimeter of the top or base panel), and a second end received in a corresponding groove of the dock.
2.11 Any of the preceding Covers, comprising four straps, each strap comprising a first end disposed with the perimeter of one of the side panels (e.g., an edge of the side panel perimeter in contact with an edge of the perimeter of the top or base panel), and a second end, and wherein the dock comprises four grooves (e.g., respectively positioned adjacent the corners of the dock), such that the second end of each strap is received in a corresponding groove of the dock.
2.12 Any of the preceding Covers, comprising four straps, wherein the first and second straps are oppositely positioned and comprise a first end disposed with opposite edges of the side panels in contact with the correspondingly opposite edges of the top panel, and wherein the third and fourth straps are oppositely positioned and comprise a first end disposed with opposite edges of the side panels in contact with the correspondingly opposite edges of the base panel, wherein each of the four straps further comprises a second end, and wherein the dock comprises four grooves (e.g., respectively positioned adjacent the corners of the dock), such that the second end of each strap is received in a corresponding groove of the dock.

2.13 Any of the preceding Covers, wherein the dock comprises at least one tether (e.g., two, three or four tethers) extending from a front face of the dock to secure the portable electronic device to a front face of the dock.

2.14 The preceding Cover, wherein the tether is elastic.

2.15 Cover 2.8 or 2.9, wherein the at least one tether possesses sufficient elastic character to secure an electronic device to the front face of the dock, such that once engaged, the portable electronic device will be substantially immovable relative to the dock.

2.16 Any of Covers 2.8-2.10, wherein the dock comprises four tethers of sufficient elastic character to secure an electronic device to the front face of the dock, e.g., wherein the four tethers possess sufficient elastic character to slip around a respective corner of a portable electronic device to maintain consistent and secure contact between the device and the front face of the dock, such that once engaged, the portable electronic device will be substantially immovable relative to the dock.

2.17 Any of the preceding Covers, wherein the dock comprises a loop on a rear face of said dock 2.18 The preceding Cover, wherein the loop is sized to receive a one or more fingers or a hand.

2.19 Any of the preceding Covers, further comprising a front panel which is parallel with and positioned opposite the rear panel.

2.20 Any of the preceding Covers, wherein the retaining sleeve is disposed along perimeters of one or more of the side panels, top panel, base panel, rear panel and front panel.

2.21 Any of the preceding Covers, wherein the retaining sleeve is disposed along perimeters of each of the side panels, front panel and rear panel.

2.22 Any of the preceding Covers, wherein the retaining sleeve is disposed along perimeters of each of the top panel, base panel, rear panel and front panel.

2.23 Any of the preceding Covers, wherein the retaining sleeve defines a channel configured to receive the resilient support member.

2.24 Any of the preceding Covers, comprising a plurality of resilient support members configured to conform to perimeters of one or more of the side panels, top panel, base panel, rear panel, and front panel.

2.25 Any of the preceding Covers, wherein one or more of the side panels, top panel, base panel, rear panel and front panel individually comprise a retaining sleeve disposed along perimeters of the respective panels.

2.26 Any of the preceding Covers, wherein each of the side panels, rear panel and front panel individually comprise a resilient support member received within a respective individual retaining sleeve.

2.27 Any of the preceding Covers, wherein the retaining sleeve defines a channel that is continuous between the perimeters of adjacent panels, e.g., wherein the retaining sleeve conforms to the perimeters of the side panels, top panel, base panel and rear panel.

2.28 The preceding Cover, comprising a first resilient support member in a first portion of the retaining sleeve disposed along the perimeter of a first side panel, a second resilient support member in a second portion of the retaining sleeve disposed along the perimeter of a second side panel, a third resilient support member in a third portion of the retaining sleeve disposed along the perimeter of the rear panel, and a fourth resilient support member in a fourth portion of the retaining sleeve disposed along the perimeter of the front panel.

2.29 Any of the preceding Covers, wherein each of the side panels, the top panel, the base panel and the rear panel comprise a material (e.g., an elastomeric mesh material, a non-elastomeric mesh material, an elastomeric opaque material, or a non-elastomeric opaque material) extending along a surface defined by the respective perimeters of the panels.

2.30 Any of the preceding Covers, wherein the front panel does not comprise a material extending along a surface defined by its perimeter.

2.31 The preceding Cover, wherein the front panel comprises a retaining sleeve and a resilient support member contained within the retaining sleeve.

2.32 Any of the preceding Covers, wherein each of the side panels, the top panel, the base panel and the rear panel comprise a material (e.g., an elastomeric mesh material, a non-elastomeric mesh material, an elastomeric opaque material, or a non-elastomeric opaque material) extending along a surface defined by the respective perimeters of the panels; and wherein the front panel does not comprise a material extending along a surface defined by its perimeter.

2.33 Any of the preceding Covers, wherein at least one of the side panels, top panel, base panel and rear panel (e.g., both side panels) comprises an access opening.

2.34 The preceding Cover, wherein one or both of the side panels comprises an access opening.

2.35 Either of the two preceding Covers, wherein said side panels comprise a flap positioned adjacent an access opening, wherein the flap is connected to one of the side panels at a first end and attachable at a second end.

2.36 The preceding Cover, wherein said flap is moveable to allow passage through the access opening.

2.37 Any of the preceding Covers, wherein the resilient support member is formed of non-brittle metal, such as aluminum or steel (e.g., spring steel), a polymer, carbon (e.g., carbon fiber), or other resilient composite material.

2.38 Any of the preceding Covers, wherein the resilient support member is formed of steel (e.g., spring steel).

2.39 Any of the preceding Covers, wherein the resilient support member is formed of spring steel.

2.40 Any of the preceding Covers, wherein the awning is movable between an expanded configuration and a collapsed configuration.

2.41 Any of the preceding Covers, wherein the interior volume of the awning is sized to receive a portable electronic device (e.g., a cellular phone or a tablet).

2.42 Any of the preceding Covers, wherein the portable electronic device is one or more of a mobile phone (i.e., a smartphone), a tablet, a portable gaming system, or a monitor.

2.43 Any of the preceding Covers, wherein the electronic device is a tablet.

2.44 Any of the preceding Covers, wherein the electronic device is a mobile phone (i.e., a smartphone).

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

BRIEF DESCRIPTION OF THE FIGURES

In part, other aspects, features, benefits and advantages of the embodiments will be apparent with regard to the following description, appended claims and accompanying drawings where:

Figure 1:
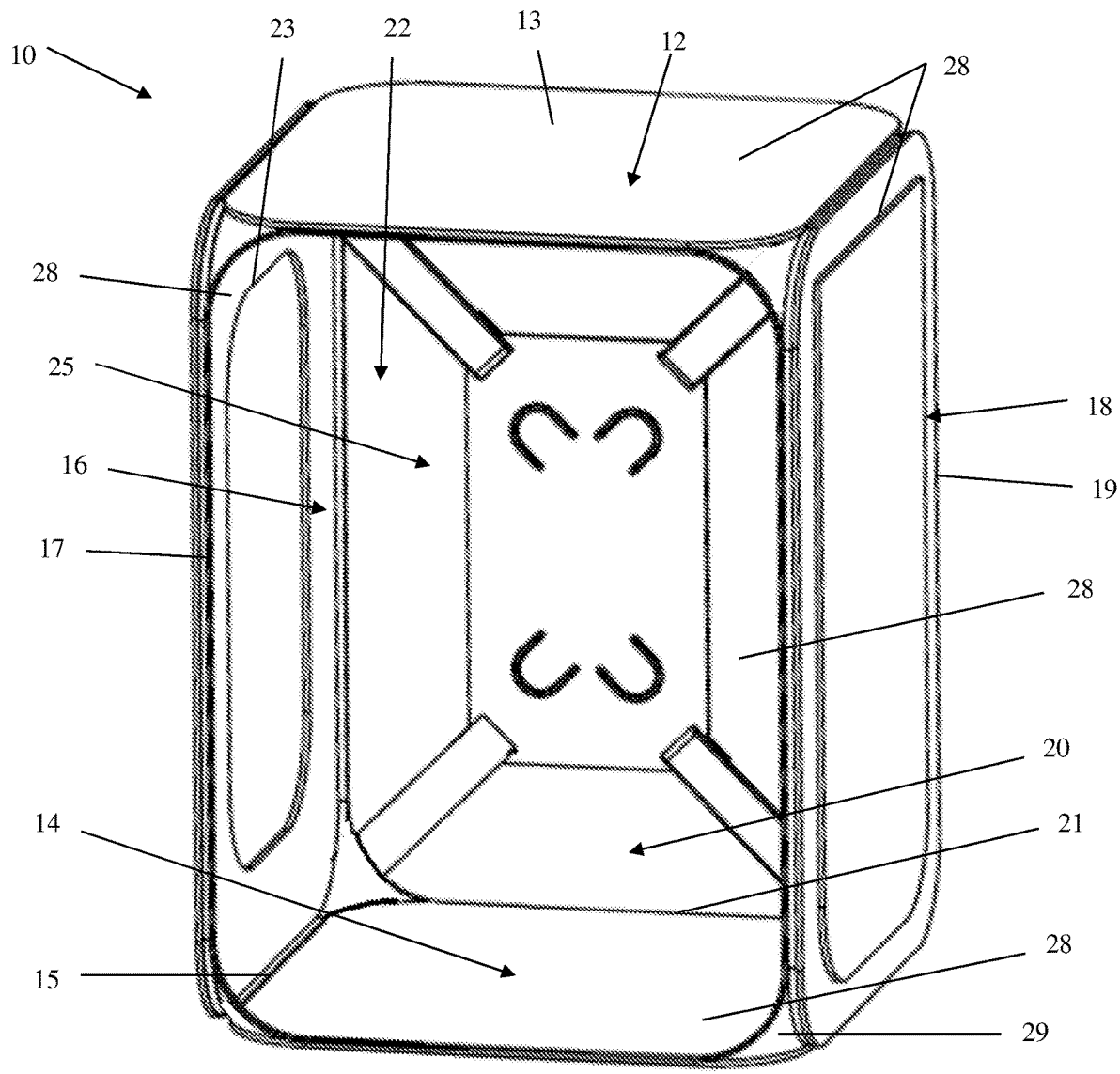
FIG. 1 illustrates a front perspective view of components of a cover in accordance with the present disclosure. The cover is shown in an expanded configuration.

It is to be understood that the figures may not be to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION

For the purposes of this specification and appended claims, unless otherwise indicated, all numbers used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present application. At the very least, and not as an attempt to limit the application of the doctrine of equivalents to the scope of the claims, each numerical parameter should at least be construed in light of ordinary rounding techniques.

It is noted that, as used in this specification and the appended claims, the singular forms "a," "an," and "the," include plural referents unless expressly and unequivocally limited to one referent. Thus, for example, reference to "a cover" may include one, two, three or more covers.

It is also understood that all spatial references, such as, for example, horizontal, vertical, top, base, upper, lower, bottom, left and right, are for illustrative purposes only and can be varied within the scope of the disclosure.

Mobile or otherwise portable technology has advanced considerably in recent years, but with these advances have come a new set of problems. For example, a smartphone can offer near limitless access to information and communication with others from virtually anywhere. A smartphone's use is primarily limited by its battery life. One of the foremost drains on a smartphone's battery derives from running the screen, especially at high brightness. When in direct sunlight, a user typically must increase the brightness of the screen to compensate for external light. Not only does this drain the battery of the smartphone faster, it also causes the smartphone to heat. If left unchecked for long enough, the smartphone could overheat. This issue is exacerbated by the heat caused by ultraviolet radiation in sunlight. Even when not in use, an electronic device exposed to direct sunlight may be subject to overheating solely from absorbed energy in the form of heat.

Thus, there exists a need for a simple and effective apparatus which solves each of these problems. The following discussion includes a description of a cover 10 for a portable electronic device such as a smartphone, tablet, or portable gaming system and provide shade for use under sunlight. Alternate embodiments are also disclosed. Reference is made in detail to the exemplary embodiments of the present disclosure, which are illustrated in the accompanying figures. Turning to FIGS. 1-7, there are illustrated components of a cover 10 for a portable electronic device.

Cover 10 includes an awning comprising a number of interconnected panels, as shown for example in FIG. 1. Top panel 12 runs parallel with and is positioned opposite base panel 14. In some embodiments, top panel 12 is non-parallel with base panel 14. Each of top panel 12 and base panel 14 comprise a perimeter (perimeters 13 and 15, respectively), which defines the shape of the respective panels. In various embodiments, for example, the embodiments shown in FIG. 1, the perimeter defines a 4-sided shape, i.e., a square or rectangular shape. However, it is envisioned that the perimeter may define any of a circular, ovoid, polygonal (e.g., triangular, pentagonal or hexagonal), or irregular shape. The corners of perimeters 13 and 15 may be rounded or sharp. In various embodiments, the corners are rounded to impart structural stability to the panel. Top panel 12 and base panel 14 have the dimensions and shape, and generally correspond to the dimensions to allow for shading of a flat electronic device, such as a smartphone, a tablet or a monitor.

Extending transversely between top panel 12 and base panel 14 are side panels 16 and 18, which may be parallel or non-parallel to one another and are situated at opposite ends of top panel 12 and base panel 14. Thus, side panels 16 and 18 are each connected to one edge of top panel 12 and one edge of base panel 14, for example by stitching, such that cover 10 forms a cross-sectional shape of a square, rectangle or other types of quadrilaterals with top panel 12 and 14. Side panels 16 and 18 are both dimensioned so as to correspond to a depth of top panel 12 and base panel 14.

Side panels 16 and 18 are positioned opposite one another, and each comprise a perimeter, which defines the shape of the respective panels. In various embodiments, for example, the embodiments shown in FIG. 1, perimeter 17 of panel 16 and perimeter 19 of panel 18 each define a 4-sided shape, i.e., a square or rectangular shape. However, it is envisioned that the perimeter may define any of a circular, ovoid, polygonal (e.g., triangular, pentagonal or hexagonal), or irregular shape. The corners of perimeters 17 and 19 for respective side panels 16 and 18 may be rounded or sharp. In various embodiments, the corners are rounded to impart structural stability to the panel.

Cover 10 also includes a rear panel 20, which is positioned transversely adjacent to each of the top panel 12, base panel 14 and side panels 16 and 18. Rear panel 20 is connected to each of the top panel 12, base panel 14 and side panels 16 and 18 along their respective edges facing toward the rear of cover 10, for example by stitching. Like the panels discussed above, rear panel 20 comprises a perimeter 21, which defines the shape of rear panel 20. In various embodiments, for example, the embodiments shown in FIG. 1, perimeter 21 of rear panel 20 defines a 4-sided shape, i.e., a square or rectangular shape. However, it is envisioned that the perimeter may define any of a circular, ovoid, polygonal (e.g., triangular, pentagonal or hexagonal), or irregular shape. The corners of perimeter 21 may be rounded or sharp. In various embodiments, the corners are rounded to impart structural stability to the panel.

Cover 10 may also comprise a front panel 22, which is parallel with and positioned opposite to rear panel 20 and transversely adjacent to each of the top panel 12, base panel 14 and side panels 16 and 18. Front panel 22 is connected to each of the top panel 12, base panel 14 and side panels 16 and 18 along their respective edges facing toward the front of cover 10, for example by stitching. Front panel 22 comprises a perimeter 23, which defines its shape. In various embodiments, for example, the embodiments shown in FIG. 1, perimeter 23 of front panel 22 defines a 4-sided shape, i.e., a square or rectangular shape. However, it is envisioned that the perimeter 23 may define any of a circular, ovoid, polygonal (e.g., triangular, pentagonal or hexagonal), or irregular shape. The corners of perimeter 23 may be rounded or sharp. In various embodiments, the corners are rounded to impart structural stability to the panel. Front panel 22 and rear panel 20 have the dimensions and shape, and generally correspond to the dimensions of a flat electronic device, such as a smartphone, a tablet or a monitor. That is, front panel 22 and rear panel 20 have a length and width corresponding with the dimensions of the flat electronic device.

Figure 2:
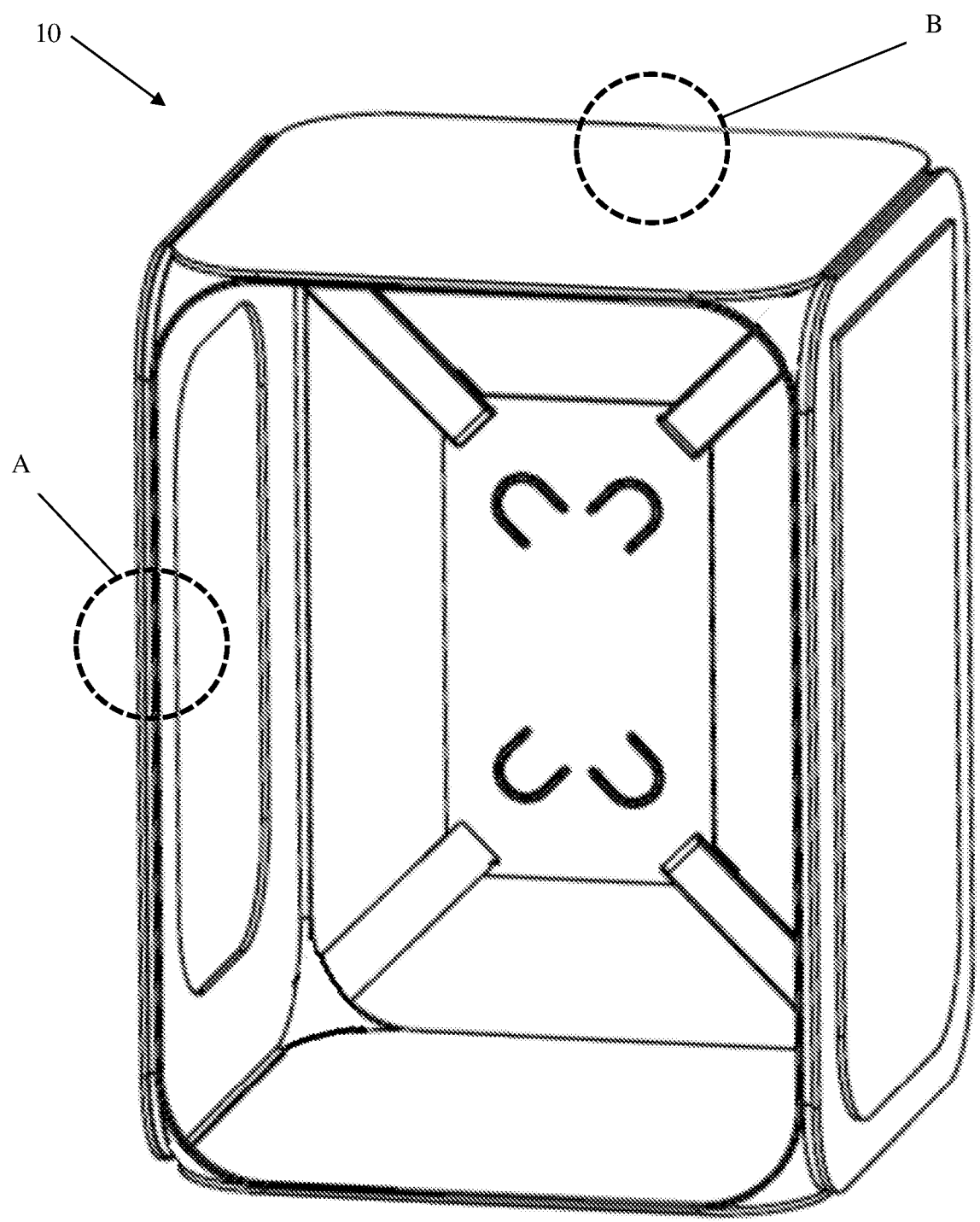
FIG. 2 illustrates a front perspective view defining cross sections A and B on a cover further shown in FIGS. 5A and 5B.
Figure 3A:
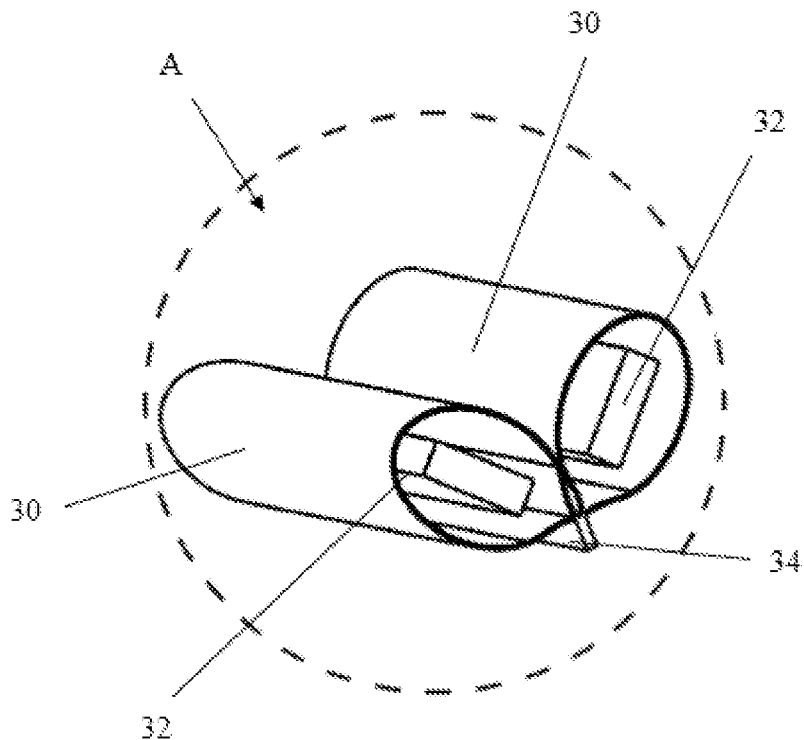
FIGS. 3A and 3B illustrate cross-sectional views of components of the presently disclosed cover.
Figure 3B:
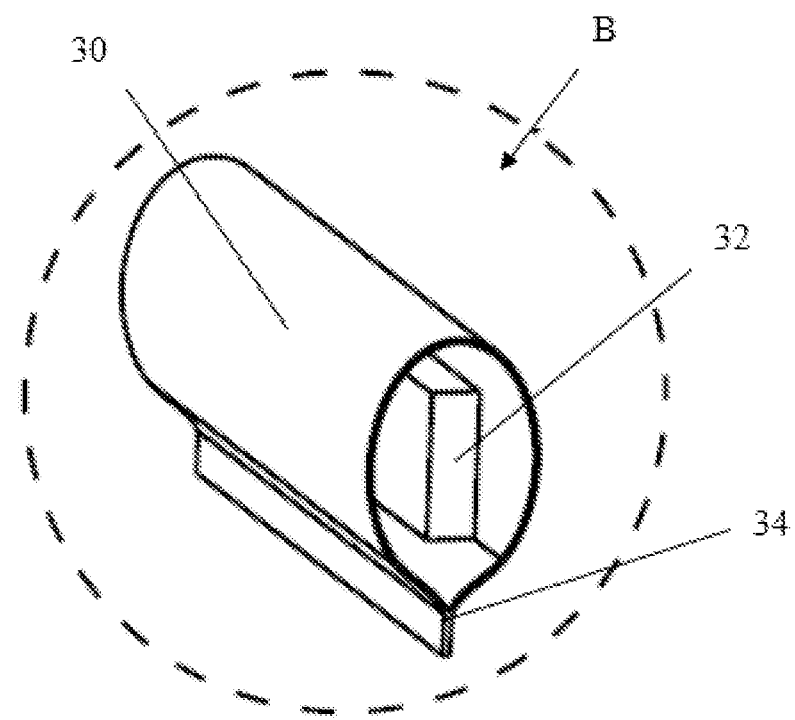

In order to impart structural rigidity to cover 10, the plurality of panels is in communication with at least one resilient support member 32 held within a channel defined by at least one retaining sleeve 30, as shown for example in FIGS. 2, 3A and 3B. In various embodiments, a retaining sleeve 30 is connected to the perimeters one or more of panels 13, 15, 17, 19, 21 and 23. For example, in some embodiments retaining sleeve 30 is disposed along perimeters of each of the top panel 12, base panel 14, rear panel 20 and front panel 22. It is envisioned that some or all of panels 12, 14, 16, 18, 20, and 22 individually comprise a retaining sleeve 30 and a corresponding resilient support member 32 disposed along perimeters of the respective panels. For example, in some embodiments each of the top panel 12, base panel 14, rear panel 20 and front panel 22 comprise a retaining sleeve 30 and a corresponding resilient support member 32. In some embodiments, side panels 16 and 18 do not comprise a retaining sleeve 30 and a corresponding resilient support member 32, but rather are supported by the frame formed by the retaining sleeves 30 and resilient support members 32 of top panel 12, base panel 14, rear panel 20 and front panel 22.

In other embodiments, each of the side panels 16 and 18, rear panel 20 and front panel 22 comprise a retaining sleeve 30 and a corresponding resilient support member 32. In such embodiments, top panel 12 and base panel 14 do not comprise a retaining sleeve 30 and a corresponding resilient support member 32, but rather are supported by the frame formed by the retaining sleeves 30 and resilient support members 32 of side panels 16 and 18, rear panel 20 and front panel 22.

In other embodiments, cover 10 comprises a single retaining sleeve 30 that is continuous along all corners of the three-dimensional shape formed by panels 12, 14, 16, 18, 20, and 22. In such an embodiment, the single retaining sleeve 30 contains a single resilient support member 32 that correspondingly extends along all corners of the three-dimensional shape formed by panels 12, 14, 16, 18, 20, and 22 through the single retaining sleeve 30.

Retaining sleeve 30 may comprise a non-elastic material (e.g., fabric) stitched along the perimeter of one or more panels of the cover 10, such that retaining sleeve 30 forms a channel to receive a resilient support member 32. In further embodiments, retaining sleeve 30 may be mechanically fastened, fused, or glued to one or more of perimeters panels 13, 15, 17, 19, 21 and 23 to retain a corresponding resilient support member 32 in position. Thus, in one embodiment, as shown in FIGS. 2, 3A and 3B, both retaining sleeve 30 and resilient support member 32 generally assumes the same shape defined by the perimeter of the panel to which it is secured. As shown in FIG. 1, retaining sleeve 30 and resilient support member 32 have a generally square or rectangular shape as defined by the perimeters of the panels.

As best illustrated by FIGS. 3A and 3B, one or more panels 12, 14, 16, 18, 20 and 22 may each comprise respective retaining sleeves 30, which may be connected to material 28 by stitching 34 that extends along a portion or the entirety of perimeter 13, 15, 17, 19, 21 or 23 of one or more of the panels. The resilient support member 32 may be provided as one continuous loop, or may be a strip of material connected at both ends to form a continuous loop. Resilient support member 32 is formed of a flexible material that is capable of retaining its shape, even after being deformed by an applied force. Thus, resilient support member 32 is, in some embodiments, formed of flexible or coilable steel (e.g., spring steel), although other materials such as plastics may also be used. Resilient support member 32 is flexible enough to allow cover 10 to be movable between two configurations, a first configuration position such as shown in FIG. 1, or a second position in which the cover 10 is collapsed into a size which is much smaller than its open position. While in the first configuration, cover 10 is open or expanded so as to be capable of receiving an electronic device within its interior volume 25. While in the second configuration, cover 10 is folded along the corners of adjoining panels so as to take on a flat conformation.

In some embodiments, top panel 12, base panel 14, rear panel 20 and front panel 22 each comprise a resilient support member 32 held within respective retaining sleeves 30, which comprise shapes corresponding with perimeters 13, 15, 21 and 23. Side panels 16 and 18 optionally do not comprise resilient support members, but rather are supported by the resilient support members attached to top panel 12, base panel 14, rear panel 20 and front panel 22. In other embodiments, each of the side panels 16 and 18, rear panel 20 and front panel 22 each comprise a resilient support member 32 held within respective retaining sleeves 30, which comprise shapes corresponding with perimeters 17, 19, 21 and 23. Top panel 12 and base panel 14 optionally do not comprised resilient support members, but rather are supported by the resilient support members attached to side panels 16 and 18, rear panel 20 and front panel 22. In other embodiments, each of panels 12, 14, 16, 18, 20 and 22 comprise individual resilient support members, which comprise shapes corresponding with perimeters 13, 15, 17, 19, 21 and 23. In some embodiments, retaining sleeve 30 extends around each of perimeters 13, 15, 17, 19, 21 and 23 such that retaining sleeve 30 forms an interconnected channel to receive a cube or cuboid shaped resilient support member 32. In such an embodiment, a singular resilient support member 32 extends along all corners of adjoining panels to provide support for cover 10. However, it is envisioned that the retaining sleeve may take any shape corresponding to the perimeter of its respective panel, e.g., circular, oval, polygona or irregular.

In an alternative embodiment, top panel 12, base panel 14, and side panels 16 and 18 each comprise a resilient support member 32 held within respective retaining sleeves 30, which comprise shapes corresponding with perimeters 13, 15, 17 and 19. Front panel 22 and rear panel 20 optionally do not comprise resilient support members, but rather are supported by the resilient support members attached to top panel 12, base panel 14, and side panels 16 and 18.

Each of top panel 12, base panel 14, side panels 16 and 18 and rear panel 20 includes a material 28 extending through the space inside their respective perimeters 22, and extends substantially continuously from between all sides of the respective panels. Material 28 extends in the area defined by the perimeters of the respective panels, such that material 28 forms a continuous surface that functions substantially as a flexible wall. Notably, front panel 22 does not comprise material 28 in order to have an open front in order to provide a window to allow a user to view the screen of a portable electronic device held within the awning of cover 10. Material 28 is secured around the perimeters of each of top panel 12, base panel 14, side panels 16 and 18 and rear panel 20, and may be sewn into place. It is envisioned that material 28 may be elastomeric to impart flexibility or non-elastomeric to impart structural rigidity. In various embodiments, material 28 is a mesh material, e.g., a polyurethane or a nylon mesh material. Material 28 may comprise any material of sufficient strength to act as enclosure for the electronic devices to be placed in cover 10, and sufficient resiliency to recover its shape after panels 12, 14, 16, 18, 20 and 22 are repeatedly folded, twisted, unfolded and allowed to return to their original shape. Any suitable fabric may also be used, such as for example, neoprene or polyester. In various embodiments, material 28 is a material comprising a netting pattern, which creates the effect of partial translucency, while also allowing for maximal ventilation of the electronic device. This allows for effective shading from sunlight while outside, while also allowing some light through the cover to allow for visibility of work tasks, such as typing on a keyboard.

In certain embodiments, the fineness of the mesh pattern is uniform for each of the panels. In other embodiments, the fineness of the mesh pattern may be varied to allow for various degrees of shading. For example, in some embodiments top panel 12 and or rear panel 20 may have a finer mesh pattern than side panels 16 and 18 and base panel 20 to minimize overhead sunlight. In some embodiments, side panels 16 and 18 may be solid and continuous material that is minimally translucent or completely opaque to ensure privacy. For clarity, the material 28 on any of panels 12, 14, 16, 18, 20 and 22 may be translucent or opaque.

Figure 4:
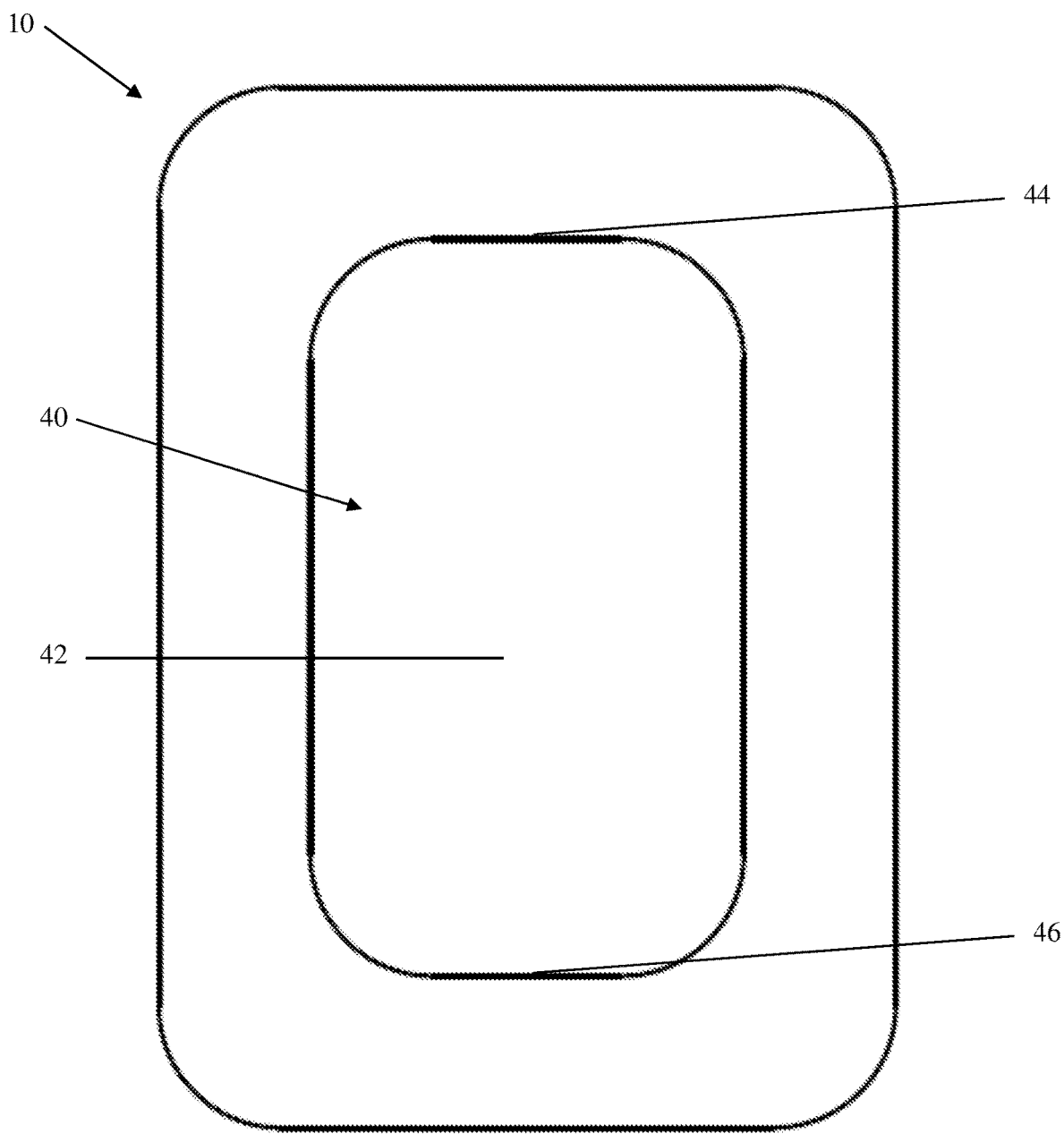
FIG. 4 illustrates a side view of components of a cover in accordance with the present disclosure.

In various embodiments, one or more of the plurality of panels (e.g., top panel 12, base panel 14, or side panels 16 or 18) includes an access opening 40, as shown for example in FIG. 4. The one or more access openings comprise an aperture present in material 28 of one or more of panels 12, 14, 16, 18, or 20. In certain embodiments, the shape of the access opening conforms to the shape of the panel on which it is disposed (e.g., square or rectangular). However, it is envisioned that the access opening may be any shape including circular, polygonal, or irregular. Access opening 40 is sized to allow for passage of a user's hand from outside the awning to the inside space of the awning (i.e., passage through the panel on which the access opening 40 is disposed). The edges of access opening 40 may include edging to impart mechanical stability. For example, the edges of access opening 40 may be sewn over or may comprise an applied material (e.g., a rigid or semi rigid material, e.g., nylon).

In certain embodiments, at least one of the side panels 16 and 18, top panel 12, base panel 14 and rear panel 20 comprises an access opening. As shown in FIGS. 1 and 4, side panels 16 and 18 each comprise an access opening 40. It is envisioned that, in certain embodiments, only one of side panel 16 or side panel 18 comprises an access opening 40.

Access openings 40 comprise a flap 42 sized to cover access opening 40 both during use and when out of use. Flap 42 generally has a shape that conforms to the shape of access opening 40. Thus, in embodiments where the shape of the access opening 40 conforms to the shape of the panel on which it is disposed (e.g., square or rectangular), the flap 42 will be a square or rectangular shape as well. Similarly, in embodiments where the access opening 40 comprises other shapes such as circular, polygonal, or irregular, flap 42 will comprise a shape as such.

Flap 42 is positioned on a panel (e.g., side panels 16 or 18) comprising the access opening 40 such that the perimeter of the flap 42 completely covers access opening 40. In certain embodiments, flap 42 is attached to the panel adjacent to access opening 40 at one end. For example, when present on side panel 16 or 18, flap 42 may be attached at an end toward top panel 12. For example, as shown in FIG. 4, flap 42 may be attached at top end 44, while bottom end 46 is not attached to the panel. That is, top end 44 of flap 42 may be permanently affixed to the panel, while bottom end may only be temporarily attachable to material 28 of the panel. For example, bottom end 46 may be attached by magnet, clasp, Velcro or similar fabric, hook and loop, adhesive or other such means of attachment known in the art.

Flap 42 is comprised of a flexible material to allow for a user to easily push past it to access the interior volume 25 of the awning of cover 10. For example, flap 42 may comprise the same material 28 as that of any of panels 12, 14, 16, 18, 20 or 22.

In further embodiments, cover 10 comprises corner supports 29, which are attached to and held taut at the corners of adjoining panels. Corner supports 29 are made from strong, lightweight materials and may include woven fabrics, cloth, sheet fabrics, straps, nylon, string, rope or films. In some embodiments, corner supports 29 are made from the same mesh material as material 28. Corner supports 29 function to provide the cover 10 with a pre-defined configuration, e.g., an open configuration which may take a cube or cuboid shape.

Together, panels 12, 14, 16, 18 and 20 form a three-dimensional shape defining an interior volume 25. In various embodiments, the three-dimensional shape formed by the panels is a cube or cuboid shape configured to receive an electronic device, such as a smartphone or tablet, in an open configuration.

Cover 10 is configured to allow a user to access an electronic device confined within interior volume 25. The front-facing edges of top panel 12, base panel 14, and side panels 16 and 18, i.e., the edges of those panels positioned opposite rear panel 20, define an opening into interior volume 25. Alternatively or in addition, front panel 22 defines an opening into interior volume 25. Interior volume 25 is sized to accommodate an electronic device which has a screen. For example, the present cover 10 may be configured to receive a smartphone, a tablet, or a monitor. Interior volume 25 is sized so as to allow a user to interface with the electronic device, for example, through use of a touchscreen, while viewing the screen.

Figure 5:
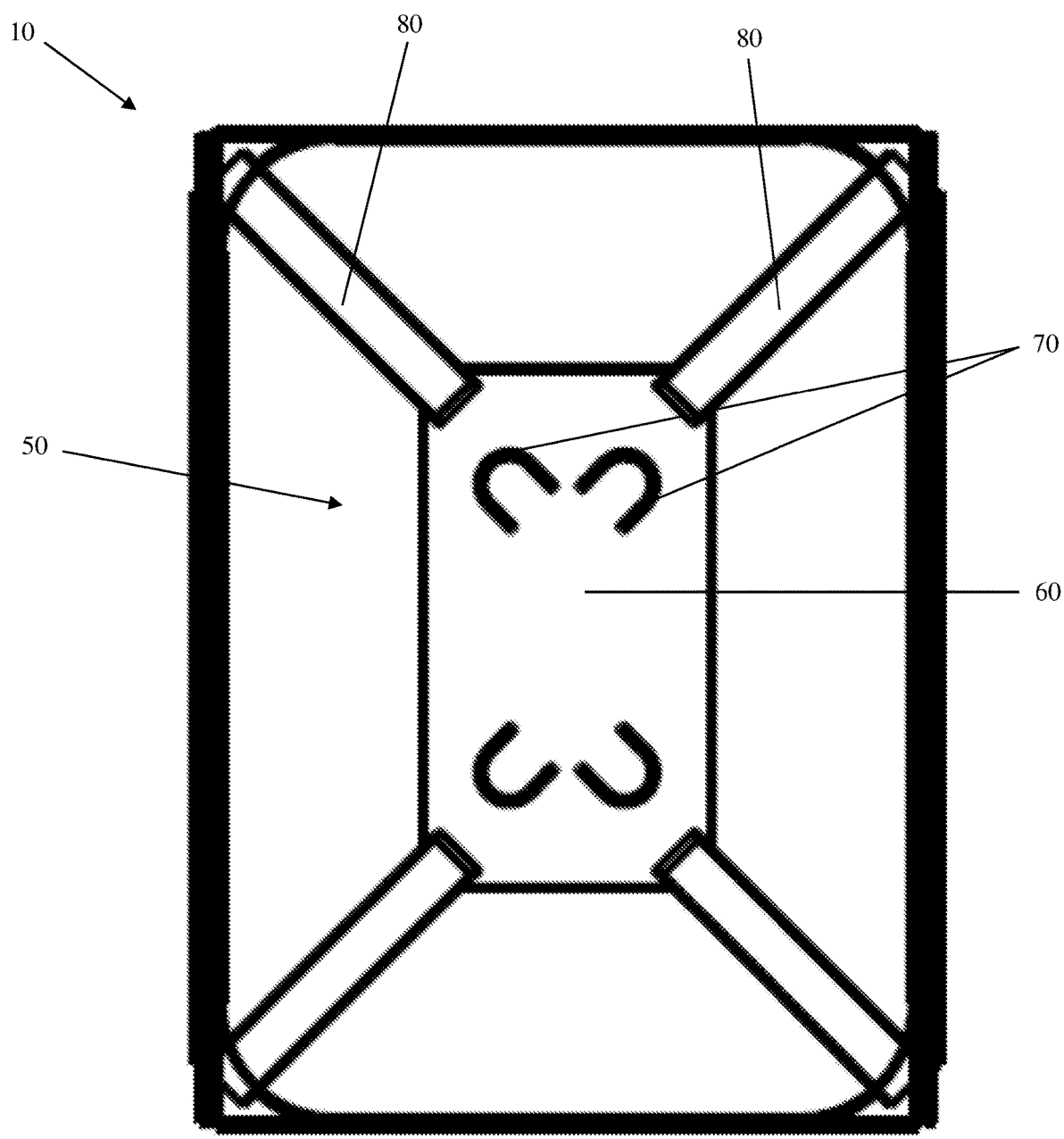
FIG. 5 illustrates a front view of components of a cover in accordance with the present disclosure.

In various embodiments, cover 10 is adapted to secure an electronic device through the use of a brace 50, as shown in FIG. 5. Brace 50 comprises a dock 60, which is configured to secure an electronic device inside the interior volume 25 of cover 10. Dock 60 is generally sized to conform to the size and shape of said portable electronic device (e.g., smartphone, tablet or monitor). The shape of dock 60 is defined by perimeter 66. In certain embodiments, dock 60 comprises a square or rectangular shape. However, it is envisioned that dock 60 may alternatively be circular, polygonal or irregularly shaped. Dock 60 may be formed from a resiliently flexible material for structural integrity. For example, dock 60 may be made from silicone, rubber, paraffin wax, polyethylene or other such materials. In some embodiments, dock 60 is formed from a material which possesses a rubberized texture to keep the electronic device from slipping on the surface of dock 60. However, in other embodiments, dock 60 may be made from a non-flexible, rigid material, e.g., wood, metal, ceramic, glass or plastics. Dock 60 may be comprised of a single unitary piece, which may be made by injection molding or other known methods in the art. Dock 60 may alternatively be made of a multitude of pieces which may be assembled together to form dock 60.

Figure 6:
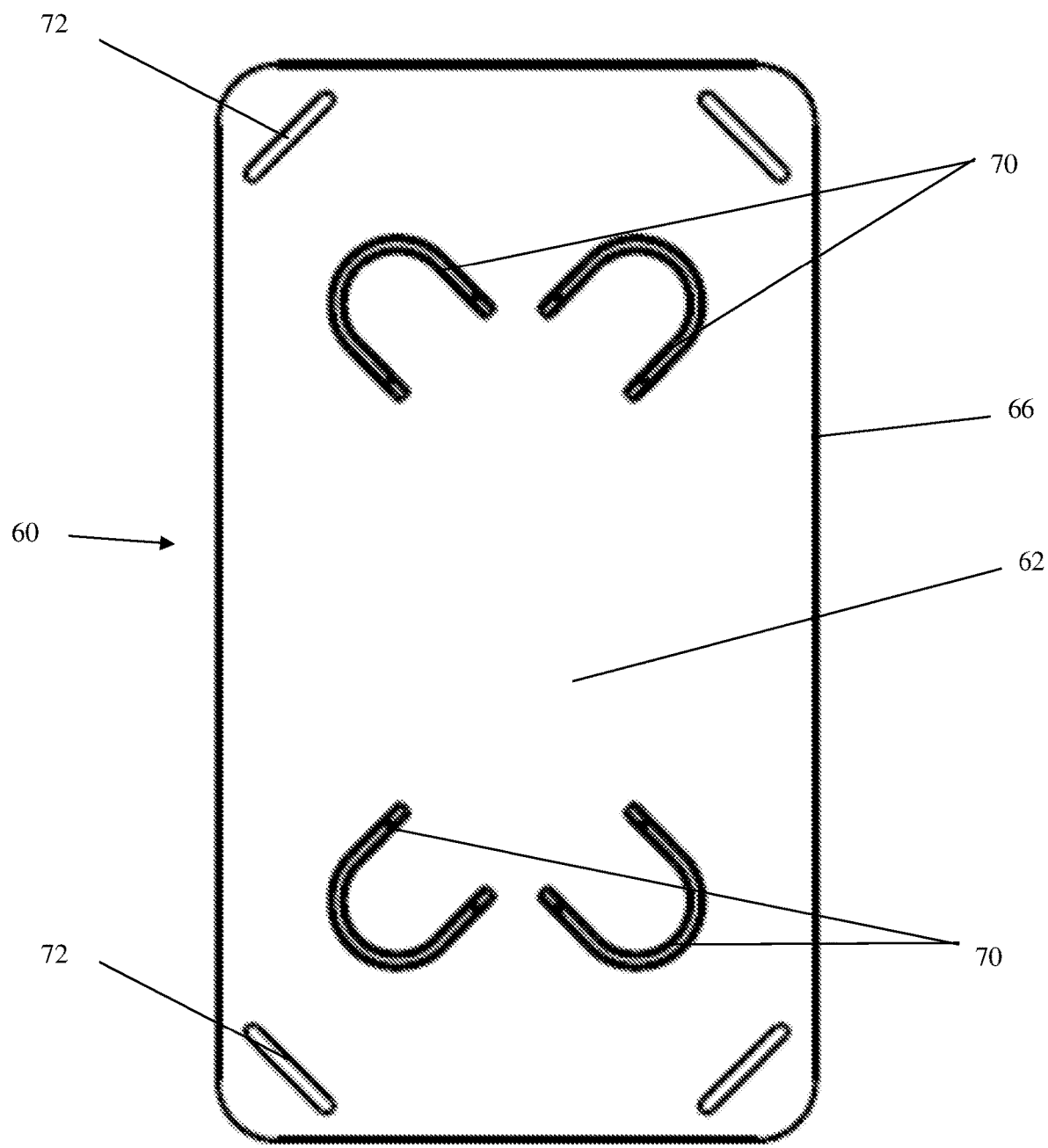
FIG. 6 illustrates a front view of a dock in accordance with the present disclosure.

Dock 60 comprises a front face 62 configured to receive an electronic device. Front face 62 comprises at least one tether 70 attached thereto. The at least one tether 70 is capable of looping around a portion of an electronic device to firmly secure it to front face 62. In certain embodiments, dock 60 comprises a plurality of tethers 70. As shown in FIG. 6, dock 60 comprises 4 tethers extending from front face 62. Tethers 70 are generally positioned adjacent respective corners of dock 60. However, tethers 70 may be positioned in a variety of arrangements as necessary to secure an electronic device. As shown in the embodiment of FIG. 6, dock 60 comprises two oppositely positioned pairs of tethers 70 at opposite corners (i.e., first pair comprising the top left tether and bottom right tether, and the second pair comprising the top right tether and bottom left tether). However, it is envisioned that a dock of the present disclosure may alternatively have only one such oppositely positioned pair of tethers 70.

In various embodiments, tethers 70 are elastic, and possesses sufficient elastic character to secure an electronic device to front face 62 of dock 60, such that once engaged, the portable electronic device will be substantially immovable relative to the dock. In some embodiments, each of tethers 70 is an elastic rubber or silicone line. In other embodiments, each of tethers 70 is a string or wire made comprised of an elastic material. As shown in the embodiment of FIG. 6, each of tethers 70 possess sufficient elastic character to extend from front face 62 and slip around a respective corner of a portable electronic device to maintain consistent and secure contact between the device and front face 62 of dock 60. As such, once engaged, the portable electronic device will be substantially immovable relative to dock 60 until the user removes tethers 70 from the respective corners of the electronic device. In various other embodiments, tethers 70 may be stretched to extend around the length and/or width of the electronic device.

The at least one tether 70 may be permanently affixed to front face 62. For example, each tether 70 may be stitched, glued, fused or tied to front face 62 at both ends of the at least one tether 70. Each of the tethers may be unitary with dock 60, i.e., the materials of tethers 70 are continuous with the material of dock 60. In such embodiments, the tethers 70 may be, e.g., made by injection molding as a part of dock 60. Alternatively, tethers 70 may pass through holes in dock 60 and may be held loosely by knots at either end that prevent the tether 70 from being removed from dock 60 without undoing the knots.

Figure 7:
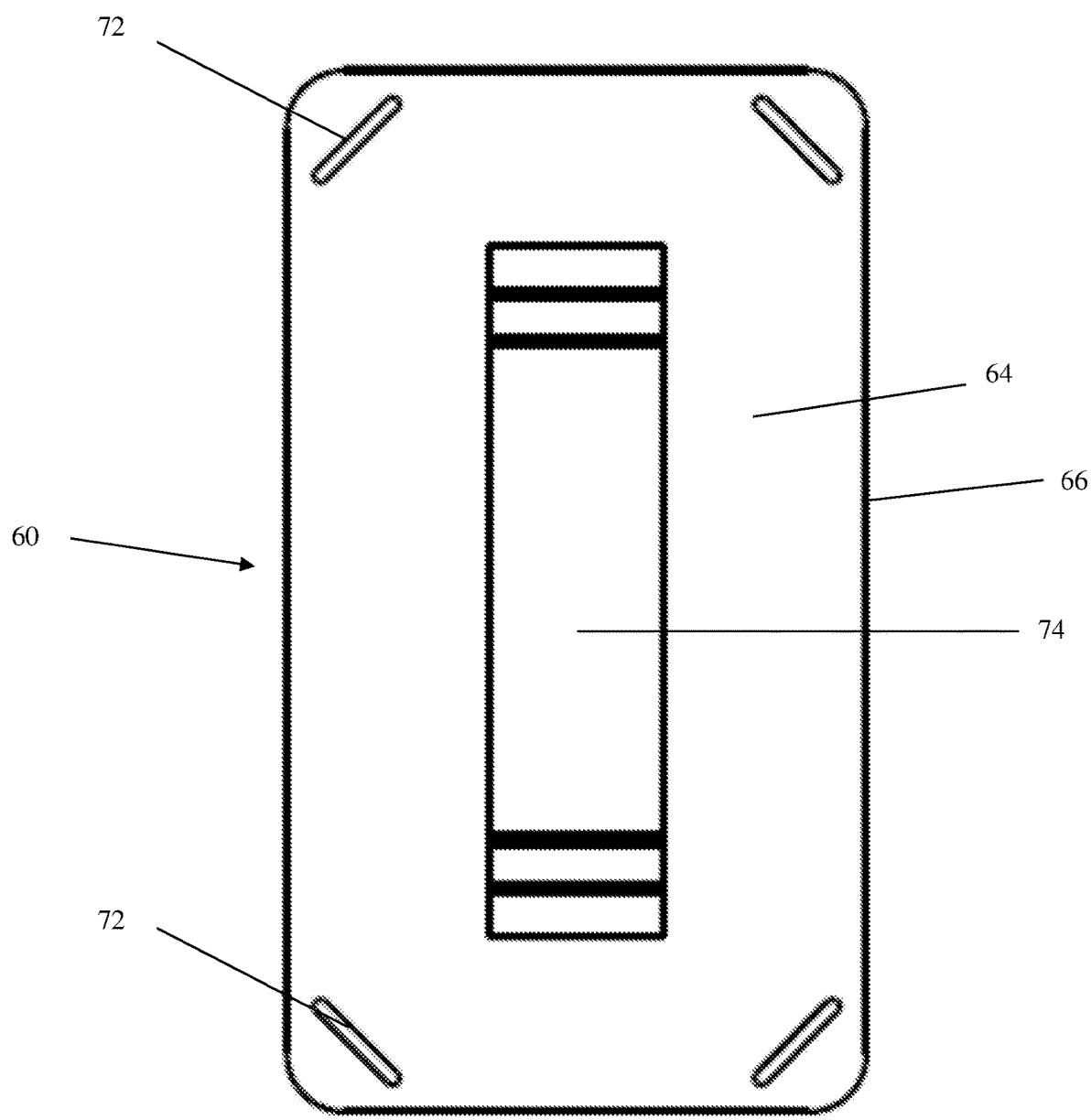
FIG. 7 illustrates a rear view of a dock in accordance with the present disclosure.

As shown in FIG. 7, dock 60 further comprises a rear face 64 positioned opposite front face 62. Rear face 64 comprises a finger loop 74 sized to receive one or more of a user's finger or hand. During use, the user passes a hand through the access opening to grasp the electronic device. The user's grip may be secured through the use of finger loop 74. In various embodiments, loop 74 is made from the same material as dock 60. Loop 74 may be made from silicone, rubber, paraffin wax, polyethylene or other such materials. In some embodiments, loop 74 is formed from a material which possesses a rubberized texture to aid a user in maintaining grip on dock 60. In other embodiments, loop 74 is made from a fabric, such as cotton or nylon. Loop 74 may be elastic or non-elastic.

It is further envisioned that in certain embodiments, loop 74 may be made from a rigid material that folds away from rear face 64. That is, loop 74 may comprise one or more hinged corners to enable it to fold flat against rear face 64 when not in use, and to fold out to create a passageway for one or more of a user's finger or hand during use.

Brace 50 further comprises one or more straps 80 which removably attach one or more side panels 16 or 18, top panel 12, base panel 14 or rear panel 20 with dock 60. In various embodiments, straps 80 are elastic, and may comprise sufficient elastic character to center the dock 60, and by extension the electronic device, in interior volume 25. However, it is envisioned that in certain embodiments, straps 80 may be non-elastic. In various embodiments, strap 80 may be made from nylon or similar material. Brace 50 may comprise two, three, four or more straps 80. Dock 60 correspondingly comprises one or more grooves 72 sized to receive a respective strap 80. That is, groove 72 is generally shaped as a slot having a width conforming to that of strap 80. Each groove 72 comprises an aperture that extends from front face 62 to rear face 64 of dock 60 to allow passage of a strap 80 therethrough.

Each of the one or more straps 80 comprises a first end disposed with one of side panels 16 or 18, top panel 12, base panel 14 or rear panel 20, and a second end received in a corresponding groove 72 of dock 60. In some embodiments, cover 10 comprises two straps 80, each of which has a first end disposed with one of side panels 16 or 18, top panel 12, base panel 14 or rear panel 20, and a second end received in a corresponding groove 72 (e.g., oppositely positioned grooves) of dock 60. In some embodiments, cover 10 comprises three straps 80, each of which has a first end disposed with one of side panels 16 or 18, top panel 12, base panel 14 or rear panel 20, and a second end received in a corresponding groove 72 (e.g., equidistant positioned grooves) of dock 60. In some embodiments, cover 10 comprises four straps 80, each of which has a first end disposed with one of side panels 16 or 18, top panel 12, base panel 14 or rear panel 20, and a second end received in a corresponding groove 72 (e.g., two pairs of oppositely positioned grooves; e.g., respectively positioned adjacent the corners of dock 60) of dock 60.

As shown, for example in FIG. 5, brace 50 comprises four straps 80, which are arranged in two pairs of oppositely positioned straps 80. In this embodiment, straps 80 are generally positioned at the corners along perimeter 21 of rear panel 20. Grooves 72 generally correspond with this positioning, and are present at oppositely positioned pairs of corners of dock 60 (i.e., first pair comprising the top left groove and bottom right groove, and the second pair comprising the top right groove and bottom left groove). However, in other embodiments, the straps may be positioned differently. For example, the straps may be positioned generally at the center of each of the sides defined by perimeter 21, rather than at the corners. In such an embodiment, dock 60 comprises four grooves positioned generally at the center of each of the sides defined by perimeter 66.

In certain embodiments, straps 80 are secured in place to one of side panels 16 or 18, top panel 12, base panel 14 or rear panel 20. For example, a first end of straps 80 may be sewn, glued, fused or otherwise permanently affixed to a point along perimeter 21 of rear panel 20.

In another embodiment, at least one strap 80 is slidably engaged with one or more of side panels 16 or 18, top panel 12, base panel 14 or rear panel 20, such that the at least one strap is moveable along a direction defined by a slide track disposed on one or more of side panels 16 or 18, top panel 12, base panel 14 or rear panel 20. In preferred embodiments, the at least one strap 80 (e.g., two, three or four straps) is slidably engaged with an edge adjoining side panel 16 or 18 with top panel 12 or bottom panel 14. In a preferred embodiment, first and second straps 80 are oppositely positioned and comprise a first end disposed with opposite edges of the side panels 16 and 18 in contact with the correspondingly opposite edges of the top panel 12, and wherein the third and fourth straps 80 are oppositely positioned and comprise a first end disposed with opposite edges of the side panels 16 and 18 in contact with the correspondingly opposite edges of the base panel 14, wherein each of the four straps 80 further comprises a second end received in a corresponding groove of the dock. That is, four straps 80 may be positioned at opposing corners of the awning, each slidably disposed with the corners connecting the side panels 16 and 18 with the top panel 12 and base panel 14. In certain embodiments, each strap is moveable along a direction defined by a slide track disposed along a corner adjoining a side panel with either the top panel or base panel. In other words, each strap is moveable along a slide track running between rear panel 20 and front panel 22. With this configuration, straps 80 may be positioned according to a user's preferred viewing angle of the electronic device held within the awning. For example, if a user is holding cover 10, the top and bottom straps will likely all be positioned at a uniform depth away from rear panel 20 such that the screen is parallel with rear panel 20. If, on the other hand, a user sets cover 10 down to view the electronic device, the top straps may be slid all the way back towards the rear panel and the bottom straps are slid towards the front panel to allow the phone to rest with screen angled upward for easy viewing. Other possible configurations are possible through sliding the straps as necessary.

In certain embodiments, comprising two, three or four straps, each of which is slidably engaged with rear panel 20, such that the at least one strap is moveable along a direction defined by a slide track disposed along a perimeter of rear panel 20. In such embodiments, strap 80 comprises an engagement member at a first end that connects with the slide track. The slide track may be modified to provide resistance to sliding to allow for manipulation of tension of straps 80. For example, the slide track may comprise one or more notches configured to catch the engagement member of strap 80 and prevent movement until the engagement member is moved beyond to notch by a user.

Straps 80 may be removeable from one or both ends. That is, each strap 80 may be removed from the awning (e.g., from whichever of side panels 16 or 18, top panel 12, base panel 14 or rear panel 20 it is disposed with). In certain embodiments, the strap may be connected to one of side panels 16 or 18, top panel 12, base panel 14 or rear panel 20 via a button, loop, clasp or other securement means known in the art. Similarly, each strap 80 may be removed from the corresponding grooves 72 of dock 60. For example, each strap 80 may comprise attachment members secure it in place once it is looped through groove 72. For example, strap 80 may have a first clasp (e.g., hook, button, magnet, Velcro segment) at a second end (i.e., the end opposite the end connected to one of the panels), and a second clasp (e.g., corresponding hook, button, magnet, Velcro segment) positioned at a point on strap 80 such that the first clasp connects with the second clasp once the second end of strap 80 is passed through groove 72. The attachment members may be a buckle which allows strap 80 to be looped through and pulled tightly to a desired tautness. Accordingly, dock 60 is removable from the plurality of panels, and may be stored separately.

Cover 10 may further comprise openings in one or more of panels 12, 14, 16, 18, and/or 20 to allow passage of cables (e.g., charge cables) to the interior volume.

In use, cover 10 can be broken down into its component parts (e.g., the awning and dock 60) and folded and collapsed into a compact configuration for storage. Starting from the open (i.e., expanded) configuration, a portable electronic device may be detached from dock 60 by removing the attachments created by tethers 72. Straps 80 may be removed from corresponding grooves 72 and dock 60 is removed from the awning. Although in some embodiments strap 80 and dock 60 are comprised of foldable material such that they need not be removed from cover 10 prior to collapsing. Any two opposite corners of the awning are pressed in toward one another. For example, a user may place inward force on the corner adjoining front panel 22 and side panel 16 and the corner adjoining side panel 18 and rear panel 20 until cover 10 collapses and the opposite corners come into contact with one another. Then the user folds cover 10 along the corners that have been brought into contact. Upon folding, cover 10 is moved to a collapsed configuration having an overall reduced size to facilitate the portability of the cover. Optionally, while in the collapsed configuration, cover 10 may be twisted so as to form a rounded coil to further reduce its size. Thus, cover 10 can be folded and stored very quickly using the steps. While in the collapsed configuration, this process may be reversed to move the cover 10 from the collapsed position to the open or expanded position. Once disassembled and collapsed, the awning and dock may be placed into a carrying case or such holding apparatus.

When preparing cover 10 for use, the method described above is essentially reversed. That is, from the folded state, the awning is uncoiled and/or unfolded to its expanded configuration (e.g., as shown in FIG. 1). Dock 60 is connected to the awning by slipping straps 80 through the corresponding grooves 72. Once the straps are passed through the grooves, they may be secured into place with a clasp present on each strap 80. A user may optionally slide the first end of one or more straps 80 (i.e., the side disposed with the perimeter of rear panel 20) along a slide track along one or more edges of adjoining panels in order to appropriately position dock 60 within the internal volume 25.

While in the open configuration, a user may secure an electronic device, such as a smartphone to the interior of cover 10 by placing the device against dock 60 and pulling tethers 72 over the corners of the device. Upon placing the device within the confines of interior volume 25 and securing to dock 60, the user can access the screen of the device, which may be a touch screen. A user may access and hold the device by pushing aside flap 42 and passing a hand through access opening 40. Once inside the confines of interior volume 25, the user may slip one or more fingers or hand through loop 74 on the rear face of dock 60. The device is visible and accessible to the user through front panel 22, which does not contain any mesh extending within its defined area.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A cover for a portable electronic device comprising:
    a series of interconnected panels comprising:
        two oppositely positioned side panels,
        a top panel and oppositely positioned to a base panel connected to the side panels, and
        a rear panel connected to each of the side panels, the top panel and the base panel;
    at least one resilient support member received within at least one retaining sleeve on one or more of the oppositely positioned side panels, top panel, base panel, or rear panel; and
a brace for the portable electronic device comprising at least one strap comprising a first end disposed with one or more of the side panels, top panel, base panel or rear panel, and a second end disposed adjacent the portable electronic device.

2. The cover according to claim 1, wherein the brace comprises a dock for the portable electronic device.

3. The cover according to claim 2, wherein the dock comprises at least one groove to receive the at least one strap.

4. The cover according to claim 3, comprising a plurality of straps, each strap comprising a first end disposed with one of the side panels, top panel, bottom panel or rear panel, and a second end received in a corresponding groove of the dock.

5. The cover according to claim 3, comprising four straps, each strap comprising a first end disposed with the perimeter of the rear panel, and a second end received in a corresponding groove of the dock.

6. The cover according to claim 2, wherein the dock comprises at least one tether extending from a front face of the dock to secure the portable electronic device to a front face of the dock.

7. The cover according to claim 2, wherein the dock comprises a loop disposed on a rear face sized to receive a user's finger or hand.

8. The cover according to claim 1, further comprising a front panel positioned opposite the rear panel.

9. The cover according to claim 1, wherein the retaining sleeve is disposed along perimeters of one or more of the side panels, top panel, base panel, rear panel, and front panel.

10. The cover according to claim 1, wherein the retaining sleeve is disposed along perimeters of each of the side panels, front panel and rear panel.

11. The cover according to claim 1, comprising a plurality of resilient support members configured to conform to perimeters of one or more of the side panels, top panel, base panel, rear panel, and front panel.

12. The cover according to claim 1, wherein one or more of the side panels, top panel, base panel, rear panel and front panel individually comprise a retaining sleeve disposed along perimeters of the respective panels.

13. The cover according to claim 1, wherein each of the side panels, rear panel and front panel individually comprise a resilient support member received within a respective retaining sleeve.

14. The cover according to claim 1, wherein each of the side panels, the top panel, the base panel and the rear panel comprise a material extending along a surface defined by the respective perimeters of the panels; and wherein the front panel, if present, does not comprise a material extending along a surface defined by its perimeter.

15. The cover according to claim 1, wherein at least one of the side panels comprises an access opening.

16. The cover according to claim 1, at least one of the side panels comprises a flap connected at a first end and attachable at a second end, wherein said flap is positioned adjacent an access opening and is freely moveable to allow passage through the at least one of the side panels.

17. The cover according to claim 1, wherein the resilient support member is formed of a non-brittle metal, such as aluminum or steel, a polymer, carbon, or other resilient composite material.

18. The cover according to claim 1, wherein the cover is movable between an expanded configuration and a collapsed configuration.

19. The cover according to claim 1, wherein the interior volume is sized to receive a flat electronic device.

* * * * *